United States Patent [19]

Kieburtz

[11] 3,885,141

[45] May 20, 1975

[54] MODULAR PIPELINE MULTIPLIER TO GENERATE A ROUNDED PRODUCT

[75] Inventor: Robert Bruce Kieburtz, Fair Haven, N.J.

[73] Assignee: Bell Telephone Laboratories, Incorporated, Murray Hill, N.J.

[22] Filed: Feb. 6, 1974

[21] Appl. No.: 440,067

[52] U.S. Cl. .............................................. 235/164
[51] Int. Cl. .............................................. G06f 7/54
[58] Field of Search ..................................... 235/164

[56] References Cited

UNITED STATES PATENTS 3,610,907 10/1971 Taylor ................................ 235/164
3,617,723 11/1971 Melvin ................................ 235/164
3,794,820 2/1974 Robinson ............................ 235/164

*Primary Examiner*—Malcolm A. Morrison
*Assistant Examiner*—David H. Malzahn
*Attorney, Agent, or Firm*—R. A. Ryan

[57] ABSTRACT

A serial digital multiplier includes *m* identical cascaded stages for generating the rounded product of an *n*-bit binary data word and an *m*-bit binary coefficient word. The multiplier further includes means for applying a logic 1 signal to the first stage to effect rounding of the final product at the output of the multiplier.

7 Claims, 6 Drawing Figures

FIG. 2
PRIOR ART
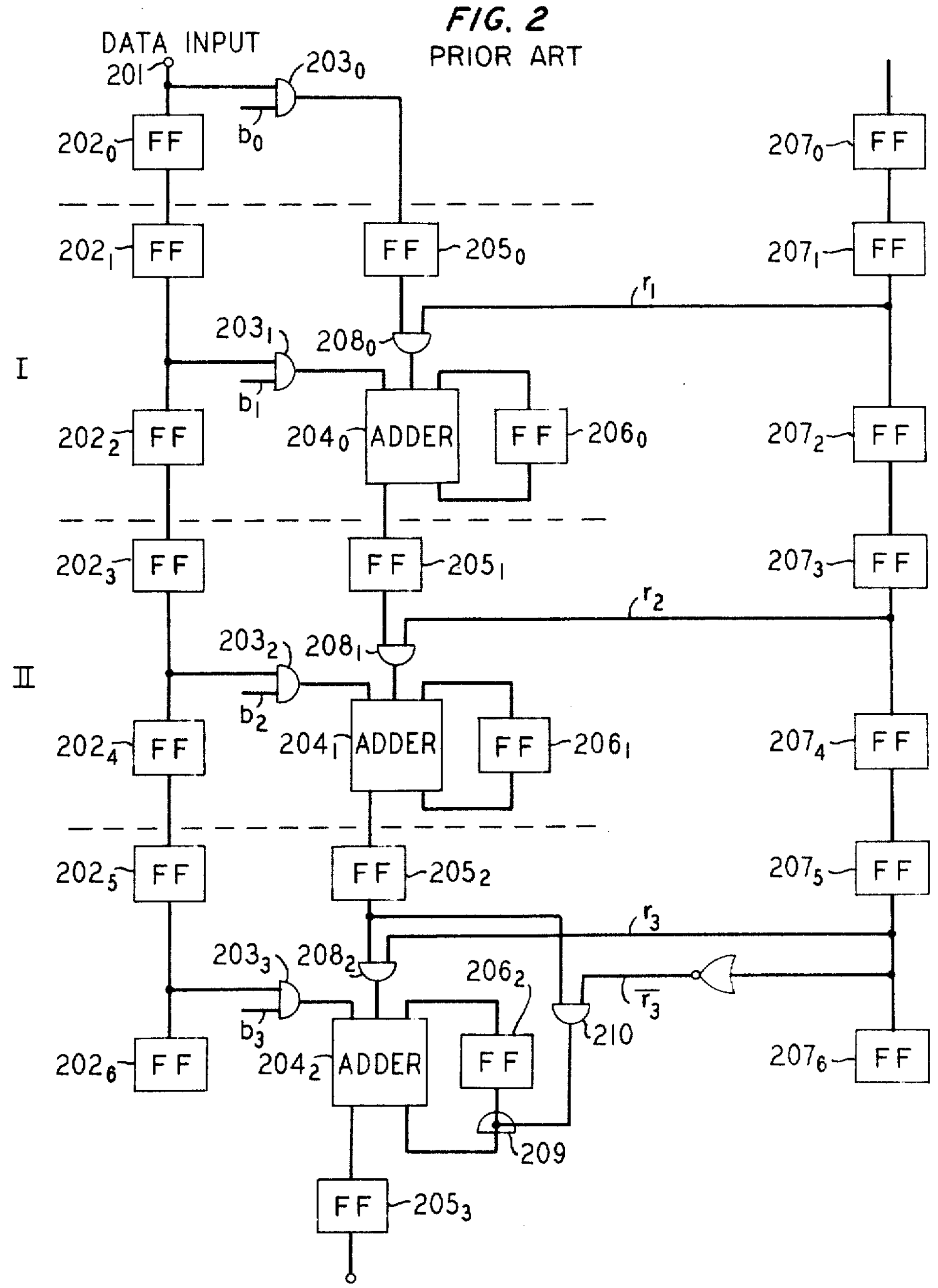
FIG. 3
PRIOR ART
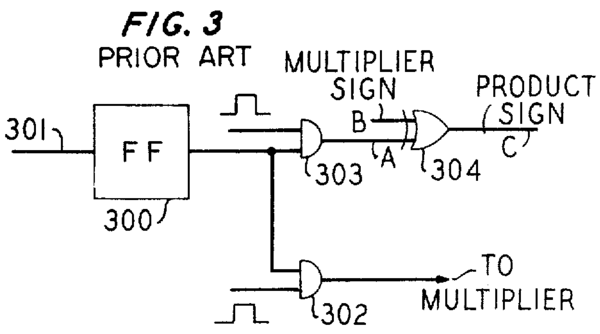
FIG. 3A
| A | B | C | ⊕ |
|---|---|---|---|
| 0 | 0 | + | 0 |
| 0 | 1 | − | 1 |
| 1 | 0 | − | 1 |
| 1 | 1 | + | 0 |

MODULAR PIPELINE MULTIPLIER TO GENERATE A ROUNDED PRODUCT

BACKGROUND OF THE INVENTION

1. Field of the Invention

The present invention relates to digital signal processors and, more specifically, to serial digital multipliers.

2. Prior Art

The serial or pipeline multiplier is typified in the prior art by that described in an article entitled "An Approach to the Implementation of Digital Filters" by L. B. Jackson, et al., appearing in the *IEEE Transactions on Audio Electroacoustics*, Vol. AU-16, pages 413–421, September 1968.

The Jackson, et al., pipeline multiplier is not completely modular in that the input, or first, and, more importantly, final stages of the multiplier must be different from the intermediate multiplier bit sections. The difference in the final stages results from the rounding process to be described in more detail below. However, it is highly desirable that digital multipliers be completely modular in design to permit convenient and, hence, economical manufacture by integrated circuit techniques.

It is an object of the present invention, therefore, to provide a fully modular digital multiplier which is adapted for efficient manufacture by integrated circuit techniques.

SUMMARY OF THE INVENTION

An improved pipeline multiplier inclues an additional input lead to the first module for applying to the multiplier the complement of a truncation signal typically applied to such multipliers. The additional input signal is arranged to increase the final rounded product by 1 if the most significant bit (MSB) of the non-retained portion of the final product is 1. The final module of the multiplier, which, in the prior art, required additional elements to effect rounding is, in the present invention, identical to all other modules in the circuit.

It is therefore a feature of the present invention that a complete serial digital multiplier includes cascaded stages of identical modules.

These and other objects, features and advantages of the present invention will be more readily understood from a consideration of the following detailed description in conjunction with the accompanying drawings.

BRIEF DESCRIPTION OF THE DRAWINGS

FIG. 2 shows a prior art pipeline multiplier;

FIG. 3 shows a sign stripper for use with the apparatus of the present invention;

FIG. 3A shows a truth table which illustrates the operation of the circuit of FIG. 3;

DETAILED DESCRIPTION

Figure 1:
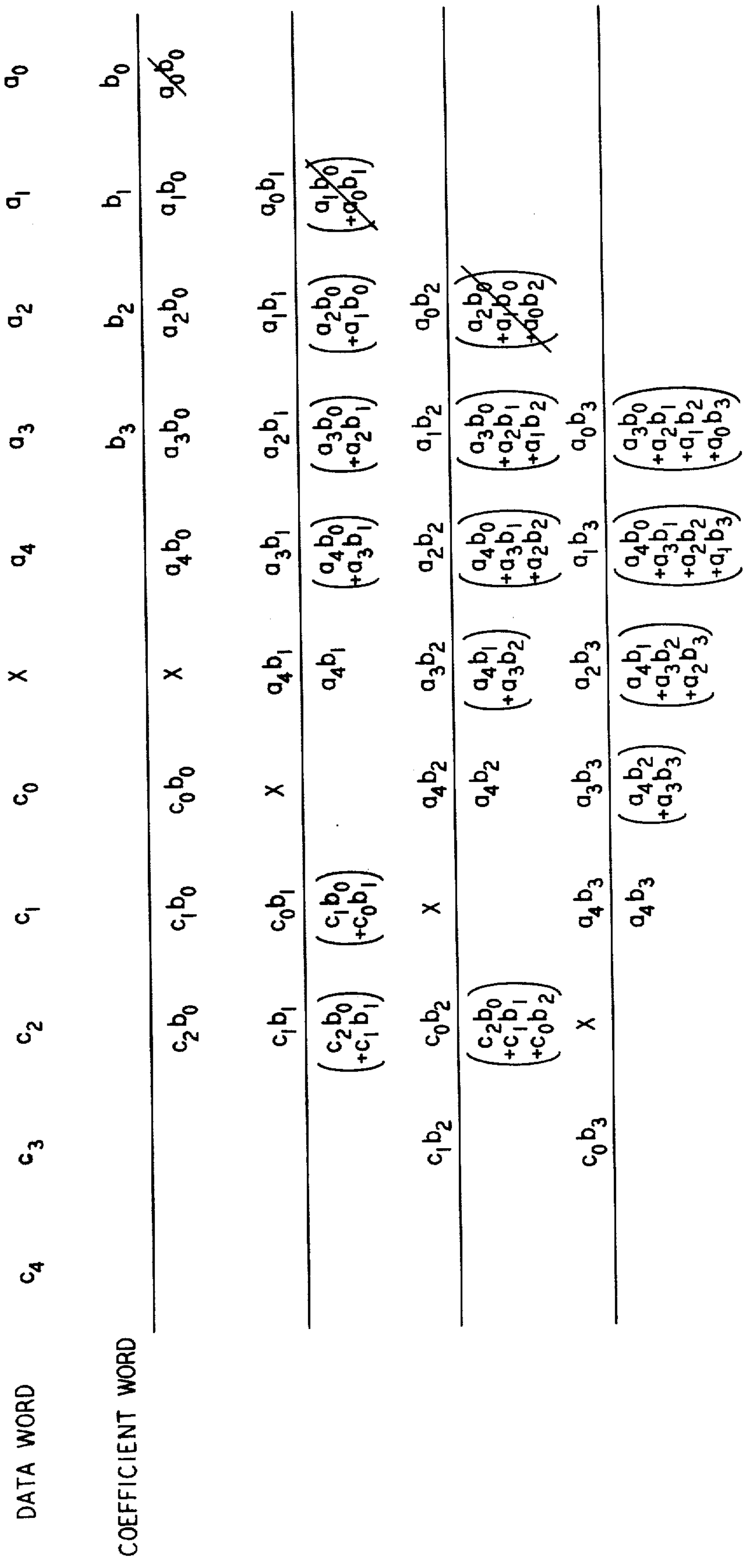
FIG. 1 illustrates the formation of partial products and final products in the multiplication of binary numbers.

FIG. 1 illustrates the formation of the product of the multiplication of the binary data word $a_n$, $n = 0, 1, 2,$ $3, 4$ by the binary coefficient word $b_k$, $k = 0, 1, 2, 3$ and a few representative partial product terms in the multiplication of the data word $c_n$, the word immediately succeeding $a_n$ in the data stream, also multiplied by the coefficient word $b_k$. Note, particularly, the bit position designated by an $x$ between the data words $a_n$ and $c_n$. This bit position corresponds to the sign bit of the data word $a_n$. In serial multipliers of the type considered herein, the sign bit is stripped from the data word and combined with the sign bit of the coefficient word before the data word is applied to the multiplier. Then, the correct sign bit of the product is appended to the final product emerging from the multiplier. The bit position left vacant by the stripped sign bit advantageously permits the multipliers to perform serial multiplication as described below.

FIG. 2 shows a prior art pipeline multiplier of the form disclosed in the publication by Jackson, et al., cited above, for generating the rounded product of the multiplications illustrated in FIG. 1. With reference to FIG. 2, the multiplicand or data word bits are applied serially, least significant bit (LSB) first, to the circuit via lead 201. The flip-flops 202$_0$ through 202$_6$ provide appropriate timing delays for the multiplicand bits. AND gates 203$_0$ through 203$_3$ logically AND the multiplicand bits and the multiplier or coefficient word bits, the coefficient word bits being applied directly to the AND gates, as shown. The adders 204$_0$ through 204$_2$ perform the additions shown in FIG. 1 and flip-flops 205$_1$ through 205$_3$ store the outputs from adders 204$_0$ through 204$_2$, respectively. The flip-flops 206$_0$ through 206$_2$ are the carry flip-flops and provide for the storing, for addition to later partial products, of carry signals from previous additions.

Attention is again directed to FIG. 1. In particular, it is noted that certain partial product terms have been stricken as well as one term in each of the final products. These are the truncated signals which are eliminated to maintain the number of bits in the final product equal to, in this instance, the number of bits in the data word, or 5. Further, recalling the discussion above, the signal truncated last is a rounding signal, as well. For purposes of clarity, it is considered useful to briefly discuss the truncation and rounding as effected by the circuit of FIG. 2. Consider, then, the shift register comprising stages 207$_0$ through 207$_6$, shown to the right of the multiplier of FIG. 2. Note that the outputs at selected registers are labeled $r_1$, $r_2$ and $r_3$. These signals are applied to AND gates 208$_0$ through 208$_2$ as shown in FIG. 2. More specifically, as the leading edge of the signal corresponding to the LSB of the data word $a_0$ is applied to flip-flop 202$_0$, the trailing edge of a negative, or 0, pulse is applied to shift register stage 207$_0$. Although the signals $r_1$, $r_2$ and $r_3$ could be obtained by other arrangements, it is noted that the one illustrated in FIG. 2 is particularly convenient because it is of the same form as the register 202$_0$ through 202$_6$. Such symmetry and duplication of course, permits further economies of the batch-fabrication techniques potentially useful in the manufacture of these multipliers.

A snapshot of the multiplier and shift register during this first interval would disclose $a_0$ in flip-flop 202$_0$, $a_0b_0$ in flip-flop 205$_0$ and a 0 in register stage 207$_1$. During the second interval of time, it is clear that $a_0$ is shifted into flip-flop 202$_1$ and $a_1$ is shifted into flip-flop 202$_0$. Simultaneously, $a_0b_0$ is shifted out of flip-flop 205$_0$ and applied to AND gate 208$_0$ along with the 0 being shifted from register stage $207_0$ to $207_1$. The output of AND gate $208_0$ at the end of the second interval is 0 and the term $a_0b_0$ has been truncated. It is also easily verified that the term $a_0b_1 + a_1b_0$ is truncated by being ANDed with the 0 signal $r_2$ at AND gate $208_1$. Similarly, the final term to be truncated, $a_2b_0 + a_1b_1 + a_0b_2$, is truncated by ANDing it with the rounding signal $r_3$ via AND gate $208_2$. However, as discussed, this last truncated signal also provides rounding information to modify the final product. Thus, when the 0 signal $r_3$ is applied to AND gate $208_2$, the complement of $r_3$, or 1, is applied to AND gate 210. The result of this operation is that, if the last truncated signal is a 1, AND gate 210 applies (via wired AND gate 209) a 1 to carry flip-flop $206_2$ and, if the last truncated signal is a 0, AND gate 210 applies a 0 to carry flip-flop $206_2$. Consequently, the signal immediately succeeding the last truncated signal, which succeeding signal is the LSB of the final product, will be increased by the addition of 1 if the last truncated signal is 1 and will be unchanged (added to 0) if the last truncated signal is 0.

The Jackson et al. multiplier shown in FIG. 2 and described above is modular to a great extent, since all the sections save the first and last are identical. The identical sections in FIG. 2 are separated by broken lines and labeled I and II, for convenience. As has been mentioned, it is highly desirable that all the multiplier sections be identical.

At this point it is considered useful to digress briefly to consider the form of the data word, coefficient word and products formed by multiplying the two as illustrated in FIG. 1. Specifically, both the data and coefficient words in FIG. 1 are shown as magnitudes only. This reflects the fact that in typical arrangements the sign bit is stripped from the data word and combined with the sign bit of the coefficient word to produce the correct sign of the product and the product sign appended to the rounded product output from the multiplier. Sign strippers, it is noted, are well known in the art. For convenience, however, a sign stripper for use with the multiplier of FIG. 2 is shown in FIG. 3. Referring to FIG. 3, the sign bit of the data word is applied to flip-flop 300 via lead 301. AND gate 302 outputs a 0 to the multiplier in place of the sign bit whether the sign bit is 0 or 1. In addition, the sign of the data word at the output of AND gate 303 is applied to exclusive-OR circuit 304 to produce the appropriate sign for the product as further illustrated by the truth table shown on FIG. 3A. The sign bit for the data word of FIG. 1, then, as applied to the multiplier, is always 0 and is hence not shown.

Of importance to an understanding of the present invention is the fact that, when the sign bit has been stripped from the data word, there remains an "empty" bit position in the data word corresponding to the stripped sign bit. This position is the position adjacent and to the left of the most significant bit of the data word, or $a_4$, in FIG. 1. Consequently, there is an unused bit position between the MSB of the first data word applied to a multiplier of the form shown in FIG. 2 and the next data word applied to the multiplier. The empty bit position is necessary to the proper operation of serial multipliers. Specifically, the interval between partial product terms permits the clearing of the carry flip-flops so that carry signals formed during the multiplication of one data word are not added to partial product terms formed during the multiplication of the succeeding word. In addition, there must be a bit position between final products generated by the multiplier into which the sign bit of the product can be inserted.

Figure 4:
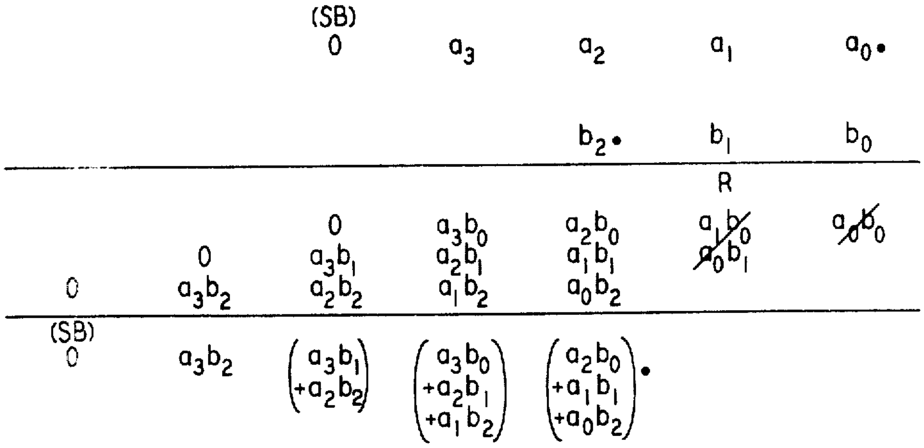
FIG. 4 illustrates the partial product formation and truncation in the multiplication of a four-bit data word by a three-bit coefficient word.

Consider for a moment the multiplication illustrated in FIG. 4. In accordance with the prior art multiplier of FIG. 2, the contribution of the last truncated term must be recorded in the carry flip-flop of the final module in order to achieve rounding of the final product. The final module must be modified, therefore, to accomplish this. Suppose instead, though, that a 1 were routinely added to the MSB of the truncated portion of the product. Clearly, then, if the MSB of the truncated portion of the product is 0, adding a 1 to it would product a sum of 1. However, since the MSB Of the truncated portion is eliminated, substituting a 1 for a 0 would not affect the final product. On the other hand, if the MSB of the truncated portion of the product is 1, and a 1 is added to it, the bit to be truncated is changed to 0 and a carry bit is produced which is added to the LSB of the final product. Thus, by routinely adding a 1 to the MSB of the truncated portion of the product, rounding of the final product is effected.

Figure 5:
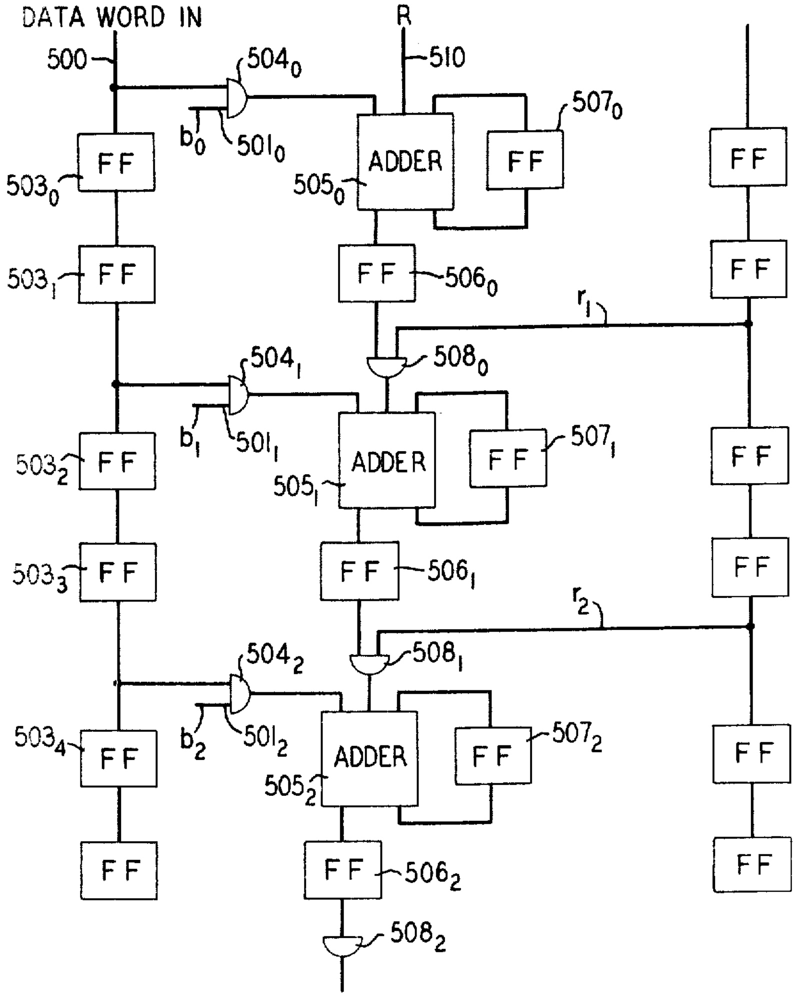
FIG. 5 shows a pipeline multiplier in accordance with the present invention for generating the final rounded product of the multiplication illustrated in FIG. 4.

The preferred embodiment of the present invention as exemplified by the circuit of FIG. 5 performs rounding by just this procedure. Consider, again, the formation of partial products and the final product shown in FIG. 4. As in the prior art circuit of FIG. 2, truncation signals, $r_1$ and $r_2$, are applied to AND gates $508_0$ and $508_1$, at the same time the signals corresponding to the terms $a_0b_0$ and $a_0b_1 + a_1b_0$ are applied to those AND gates. However, before the signal corresponding to the terms $a_0b_1 + a_1b_0$ (the MSB of the truncated portion of the product) is truncated, it is added by means of adder $505_0$ to a signal shown as R in FIG. 5, corresponding to a binary 1.

More specifically, during the first interval, the LSB of the data word, $a_0$, is applied to flip-flop $503_0$. At the same time, the term $a_0b_0$ is generated by AND gate $504_0$ and applied to adder $505_0$. Since during the first interval, there are no other signals applied to adder $505_0$, the signal corresponding to the term $a_0b_0$ is applied to flip-flop $506_0$.

During the second interval of time, $a_1$ is applied to flip-flop $503_0$ and AND gate $504_0$. At this point, the signal R, a binary 1, is applied to adder $505_0$ to be added to the signal corresponding to the term $a_1b_0$. If $a_1b_0$ is a 1, the sum of $R+a_1b_0$ is 10. A 0 is entered in flip-flop $506_0$ and a 1 is entered in carry flip-flop $507_0$. If $a_1b_0$ is 0, a 1 is entered into flip-flop $506_0$. As in the prior art arrangement, the truncation signal, $r_1$, truncates $a_0b_0$ during the second interval.

During the third interval, $a_0b_1$ is formed by means of flip-flop $503_1$ and AND gate $504_1$. Adder $505_1$ then sums the signals $a_0b_1$ and $(a_1b_0+R)$. If there is a carry signal, it is stored in carry flip-flop $507_1$ and the LSB of the sum applied to flip-flop $506_1$.

During the fourth interval, the contents of flip-flop $506_1$ are ANDed with the signal $r_2$ thereby truncating the signal corresponding to the term $a_0b_1 + a_1b_0$. Again, the carry signal, if any, produced by the addition of R is added to the next signal applied to adder $505_1$ to account for the contribution of the truncated signal to rounding of the final product.

In the circuit of FIG. 5, the rounding signal R is, advantageously, the complement of the truncation signal, $r_1$.

It is to be understood that the arrangements described in the foregoing are illustrative of the application of the principles of the invention. Numerous other arrangements may be devised by those skilled in the art without departing from the spirit and scope of the invention.

What is claimed is:

1. A pipeline digital multiplier circuit for forming the rounded product of an $n$-bit data word and an $m$-bit coefficient word comprising a. $m$ identical stages, each comprising i. first, second and third input terminals and an output terminal, ii. means for applying a uniquely associated bit of said coefficient word to said first input terminal, iii. means for forming during the $i$th time interval the bit product of said bit applied at said first input terminal with a data bit applied at said second input terminal, iv. means for generating a sum signal by adding said bit product to a bit representative of a partial product generated during the $(i-1)$th time interval and a bit representative of carry signals from previous additions, v. means for selectively inhibiting said sum signal to eliminate those sum signals which contribute only to one of the bits of the truncated portion of the product of said data word and said coefficient word, vi. means for applying said selectively inhibited sum signal to said output terminal, b. means for connecting the output terminal of each stage but the last to the third input terminal of the next succeeding stage, c. means for sequentially applying said $n$-bit data word to the second input terminal of the first of said stages, and d. means for applying a logic 1 signal to said means for generating a sum signal in said first stage.

2. Apparatus as in claim 1 wherein said means for generating a sum signal in each of said stages includes storage means for storing a signal representative of a carry bit.

3. Apparatus as in claim 2 wherein said means for forming the bit product comprises a first AND gate.

4. Apparatus as in claim 3 wherein said means for inhibiting includes a second AND gate having first and second input terminals and means for selectively applying a logic 0 to one of said second AND gate input terminals.

5. A serial multiplier for generating a set of $n$ binary signals corresponding to the $n$ most significant bits of the product of an $n$-bit binary data word and an $m$-bit binary coefficient word, comprising a. an ordered plurality of $m$ identical stages, $S_i$, $i = 1,2, \ldots m$, where $S_1$, is the input stage and $S_m$ is the output stage, b. means for simultaneously applying each of an ordered set of binary signals $b_i$, $i = 1,2, \ldots m$, to respective ones of said stages each $b_i$ representing a bit of said coefficient word where the $(b_{i+1})$th signal corresponds to the next more significant bit position than the $(b_i)$th signal, c. means for applying in sequence an ordered set of signals, $a_j$, $j = 1,2, \ldots n$, to said first multiplier stage where the signal $a_j$ corresponds to the $j$th bit of said binary data word and where the least significant bit signal $a_1$, is applied first, d. said $i$th stage, $i = 1,2, \ldots m$, comprising, i. a first AND gate for generating signals corresponding to the logical AND operation on said binary coefficient word signal $b_i$ and one of said binary data word signals $a_j$, ii. means for summing signals generated by said first AND gate with selected ones of the signals at the output of the $(i-1)$st multiplier stage, and e. means for periodically applying a logical 1 signal to said means for summing in said first stage.

6. Apparatus as in claim 5 wherein said $i$th stage further includes a second AND gate for selectively inhibiting signals generated by said summing means.

7. Apparatus as in claim 6 wherein said $i$th stage further includes storage means for storing carry signals generated by said summing means.

* * * * *